Patented Mar. 13, 1951

2,544,873

UNITED STATES PATENT OFFICE 2,544,873

PRINTING INKS AND FILMS PRINTED THEREWITH

George M. Adams, Palos Heights, Ill., assignor to The Visking Corporation, Chicago, Ill., a corporation of Virginia No Drawing. Application July 15, 1947, Serial No. 761,169

24 Claims. (Cl. 260—30.6)

This invention relates to printing inks and films printed therewith. More particularly, it relates to the printing of films formed of a composition consisting essentially of butadiene-acrylonitrile copolymer and vinyl chloride-vinyl acetate copolymer, and to the resulting printed films.

Recently there has been produced a transparent film which, in one embodiment, is formed of a composition consisting essentially of butadiene-acrylonitrile copolymer and a polymeric material, such as vinyl chloride-vinyl acetate copolymer. The film can be in the form of tubing or sheets and, in the preferred embodiment, the two copolymers in the film are present in substantially equal amounts together with a small proportion of an anti-blocking agent, such as stearamide, which also imparts improved properties, such as improved water resistance, to the film.

The film is particularly suitable for wrapping purposes. The casings are admirably suitable for the packaging of food products, such as meat, cheese, oleomargarine, etc. The film, in sheet form, is also admirably suitable for the packaging of foodstuffs.

For obvious reasons, it is highly desirable to print the above-mentioned film. An ink to be satisfactory for printing such films must form a clear, sharp print which has good covering power, tenaciously adheres to the film, and withstands the wrinkling, stretching or shrinkage which the film may be subjected to during use. Preferably also, the print should have a good gloss. Additionally, for economical reasons, the ink should be capable of being printed by high-speed presses, such as high-speed rotary presses. Consequently, the ink must not dry up on the distributing rollers. The ink, furthermore, should be of a nature which does not require heat to cause the print to tenaciously adhere to the film, since the temperature necessary for this will also distort the film.

The properties of the anti-blocking agent interfere with the ink adherence by forming a thin, waxy layer between the print and the casing. None of the known inks satisfactorily printed films of the type previously mentioned. Due to the thin layer of the anti-blocking materials, the prints did not adhere satisfactorily in the absence of heat and, when heat was utilized to cause the print to adhere, the film was distorted.

In the course of experimentation, inks containing a vinyl resin and particularly a copolymer of vinyl chloride and vinyl acetate were formulated, but when such inks were utilized the unsatisfactory results mentioned in the preceding paragraph were obtained. Even when isophorone, the slowest drying, good solvent for the vinyl copolymer, was used as the ink solvent, such ink dried too rapidly, with the result that the ink dried up on the distributing rollers of the press. When the drying rate of the ink was reduced, as by the use of an ink solvent consisting of isophorone containing 15% of dimethyl or diethyl phthalate, the ink dried satisfactorily but resulted in a print which was low in gloss and had poor hiding power. Also, a small amount of isophorone evaporated on the press during shutdowns and made restarting difficult.

An object of this invention is to provide a new and improved printing ink.

Another object of this invention is to provide printing ink particularly suitable for printing films formed of butadiene-acrylonitrile copolymer and vinyl chloride-vinyl acetate copolymer.

An additional object of this invention is to provide a method of printing films formed of butadiene-acrylonitrile copolymer and vinyl chloride-vinyl acetate copolymer.

A further object of this invention is to provide a printed film formed of butadiene-acrylonitrile copolymer and vinyl chloride-vinyl acetate copolymer in which the prints adhere satisfactorily to the film, have good gloss and hiding power, and withstand wrinkling, stretching or contracting to which the film may be subjected in use.

Other and additional objects of this invention will become apparent hereinafter.

The objects of the invention are accomplished, in general, by printing films formed of a composition consisting essentially of butadiene-acrylonitrile copolymer, vinyl chloride-vinyl acetate copolymer, and an anti-blocking agent, such as stearamide, with an ink in which the color pigments are carried in a vehicle consisting essentially of a copolymer of vinyl chloride and vinyl acetate dissolved in an alkyl phosphate of the class which consists of triethyl phosphate, tri-(n)propyl phosphate and tri-(n) butyl phosphate. Preferably also, the ink also contains a resinous plasticizer for the vinyl resin copolymer constituent of the ink, such plasticizer also being of low volatility and compatible with the vinyl resin constituent of the ink.

The prints dry through the absorption of the alkyl phosphate into the film. Therefore, in accordance with the preferred embodiment of the invention, continuous lengths of the film are fed through a rotary press whereby such film is printed and, after dusting the prints in the known manner to prevent off-set, the film is immediately reeled, the drying occurring after the film has been reeled.

The details and manner of practicing the invention will become apparent by reference to the following specific examples, it being understood that these examples are merely illustrative embodiments of the invention and that the scope of the invention is not limited thereto. Throughout the examples, the proportions are parts by weight.

Example I.—Red ink

| | Parts |
|---|---|
| Permanent Red 2B | 320 |
| Titanium dioxide (rutile form) | 65 |
| Vinyl resin | 540 |
| Tri-(n)butyl phosphate | 2010 |
| Non-volatile, non-migratable resinous plasticizer for the vinyl resin component | 125 |

The vinyl resin is the copolymer obtained by copolymerizing 86 parts of vinyl chloride and 14 parts of vinyl acetate and has a molecular weight of 9500.

A film formed of a composition consisting of equal parts of butadiene-acrylonitrile copolymer (45% acrylonitrile) and vinyl chloride-vinyl acetate copolymer (95% vinyl chloride) and 3% by weight of stearamide was printed in a rotary press with the above-described ink. The prints were dusted to prevent off-set and the film immediately reeled. Drying occurred by absorption of the alkyl phosphate by the film.

The prints had good covering power, good gloss, and satisfactorily adhered to the film.

Example II.—Canary Yellow ink

| | Parts |
|---|---|
| Titanium dioxide (rutile form) | 358 |
| Benzidene Yellow (medium shade) | 125 |
| Hansa Yellow (light shade) | 36 |
| Dehydrated silica gel (Santocel #45) | 16 |
| Vinyl resin | 580 |
| Tri-(n)butyl phosphate | 1740 |
| Non-volatile, non-migratable resinous plasticizer for the vinyl resin component | 145 |

The vinyl resin is the copolymer obtained by copolymerizing 86 parts of vinyl chloride and 14 parts of vinyl acetate and has a molecular weight of 9500.

A film, such as set forth in Example I, was printed and reeled as described in Example I.

The properties of the dried prints were similar to those obtained in Example I.

Example III.—Dark Green ink

| | Parts |
|---|---|
| Hansa Yellow (light shade) | 69 |
| Phthalocyanine Blue | 31 |
| Titanium dioxide (rutile form) | 31 |
| Carbon black | 2 |
| Vinyl resin | 204 |
| Tri-(n)butyl phosphate | 612 |
| Non-volatile, non-migratable resinous plasticizer for the vinyl resin component | 51 |

The vinyl resin is the copolymer obtained by copolymerizing 86 parts of vinyl chloride and 14 parts of vinyl acetate and has a molecular weight of 9500.

A film, such as set forth in Example I, was printed and reeled as described in Example I.

The properties of the dried prints were similar to those obtained in Example I.

As is shown by the examples, the ink vehicle in the preferred embodiment of the invention consists of tri-(n)butyl phosphate, a specific vinyl chloride-vinyl acetate copolymer and a resinous, non-migratable, non-volatile plasticizer which is compatible with the vinyl copolymer of the vehicle. As will hereafter appear, the ink of this invention is not restricted to such specific vehicle.

The nature of the solvent of the vehicle is important. Not only is it a solvent for the vinyl resin and resinous plasticizer of the ink, but is also of a type which is absorbed by the film on which the ink is printed whereby drying of the prints is obtained. In general, an alkyl phosphate, such as triethyl phosphate, tri-(n)propyl phosphate and tri-(n)butyl phosphate, can be used. Alkyl phosphates which are not solvents for the resinous components of the ink and the film which is to be printed are not within the scope of this invention.

Instead of the specific vinyl chloride-vinyl acetate copolymer of the specific examples, other vinyl chloride-vinyl acetate copolymers can be used. For example, a copolymer made by copolymerizing 65 parts of vinyl chloride and 35 parts of vinyl acetate and having a molecular weight of about 6000, or a copolymer made by copolymerizing 86 parts of vinyl chloride and 14 parts of vinyl acetate and having a molecular weight of 5500, or a copolymer made by polymerizing 87 parts of vinyl chloride and 13 parts of vinyl acetate and having a molecular weight of from 15,000 to 16,000 can be used.

The vinyl chloride-vinyl acetate copolymers contemplated by this invention are soluble in the alkyl phosphates hereinbefore referred to and form free-flowing liquids. The vinyl chloride-vinyl acetate copolymer component of the ink is preferably used in amounts of from 25% to 33⅓% by weight of the alkyl phosphate.

The plasticizer can be any of the well-known resinous polymeric or polyester plasticizers for vinyl chloride-vinyl acetate copolymers. Such resinous plasticizers are characterized by their non-migratability, low volatility, and compatability with vinyl chloride-vinyl acetate copolymers. An illustrative example of the broad class of resinous plasticizers which have been used is polyglycol sebacate obtained by the reaction of sebacic acid and propylene glycol as disclosed in United States Patent No. 2,437,046 (sold under the trade names "Paraplex G-25" and "Paraplex G-40").

The preferred quantity of the resinous plasticizer in the ink is 20% to 25% by weight based on the total vehicle solids. However, such plasticizer can be used in amounts of from about 15% to about 30% by weight based on the total vehicle solids.

The invention is not restricted to any specific pigments. Any pigment or mixture of pigments which will produce the desired color can be used. In general, the quantity of the pigments incorporated in the ink is such as to produce a print of good covering power.

The ink can also include any of the well-known ink modifiers, as, for example, dehydrated silica gel (see Example II) for controlling the flow and tackiness of the ink.

The inks of this invention require no special process for the preparation thereof. The usual procedure of dissolving the vehicle solids in the solvent and thereafter incorporating the pigment and other ingredients can be used.

The film which is to be printed is formed of a composition consisting of butadiene-acrylonitrile copolymer and a polymeric compound of the class which consists of polyvinyl chloride, a copolymer of vinyl chloride in which the vinyl chloride is the predominant constituent, and a copolymer of vinylidene chloride and vinyl chloride, the vinylidene chloride being present in an amount up to 70%, and preferably also an anti-blocking agent.

In general, the butadiene-acrylonitrile copolymer is obtained by polymerizing a mixture of the respective monomers in which the acrylonitrile constitutes from about 25% to 60% by weight of the total monomers. In the preferred embodiment of the invention, the butadiene-acrylonitrile copolymer is formed by polymerizing a mixture of the monomers in which the acrylonitrile is present in an amount consisting of 35% to 45% by weight of the total quantities of the monomers. Butadiene-acrylonitrile copolymers made from a polymerizing mixture containing 40% to 45% acrylonitrile are particularly suitable.

The polyvinyl chloride is obtained by polymerizing vinyl chloride in the usual manner. The copolymer of vinyl chloride is one which has been obtained by the copolymerization of vinyl chloride with a small proportion of vinyl acetate, vinyl cyanide, styrene, methylmethacrylate, or the like. Vinyl chloride-vinyl acetate copolymer containing from 87% to 98% and preferably 95% vinyl chloride is the preferred copolymer. The vinylidene chloride-vinyl chloride copolymer is obtained by polymerizing a mixture of vinylidene chloride and vinyl chloride, the vinylidene chloride constituting not over 70% of said mixture, in the usual manner.

Though stearamide is the preferred anti-blocking agent, other amides, such as dodecanamide, octanamide, decanamide, tetradecanamide, hexadecanamide, 9-octadecanamide, octadecadienamide, didodecyl sebacamide, dioctadecenyl sebacamide, and mixtures of the same, may be used. Preferably, the film contains 3% of the amide, although the film can contain as much as 6% and as little as ½% thereof.

The film, in its preferred embodiment and as shown by the examples, contains approximately equal proportions of the two polymeric materials. However, since the two polymeric materials are compatible over the entire range, any other proportions thereof can be used.

The ink is not restricted to use in a rotary press. It can also be used in other known types of printing presses, such as a flat bed letter press. Likewise, the film need not be continuous. It can be in casings or sheets of predetermined length and, after printing, can be dusted and piled or stacked in the usual manner.

The invention provides an ink which can be used to satisfactorily print films of the type herein described and produce a printed film wherein the prints are not only of good covering power and good gloss but also adhere to the film and withstand the wrinkling, stretching or shrinkage to which the film may be subjected in use. Due to the nature of the ink, it can be utilized in high-speed presses and, since the ink dries by the absorption of the solvent by the film, no special means for drying are necessary, and the freshly printed film, after appropriate dusting, can be immediately reeled or stacked depending on the form of the film.

Since it is obvious that various changes and modifications can be made in the above description without departing from the nature or spirit thereof, this invention is not restricted thereto except as set forth in the appended claims.

I claim:

1. For printing films formed of a composition consisting essentially of a butadiene-acrylonitrile copolymer, a polymer selected from the group which consists of polyvinyl chloride, a copolymer of vinyl chloride and vinyl acetate in which the vinyl chloride is the major constituent, a copolymer of vinylidene chloride and vinyl chloride in which the vinylidene chloride is present in an amount not over 70%, and an anti-blocking agent, an ink comprising colored pigments and a vehicle consisting essentially of an alkyl phosphate of the class which consists of triethyl phosphate, tri-(n)-propyl phosphate and tri-(n)butyl phosphate, a vinyl chloride-vinyl acetate copolymer in which the vinyl chloride is the major constituent, said copolymer being soluble in said alkyl phosphate and present in an amount of from 25% to 33⅓% by weight of said alkyl phosphate, and a resinous, non-migratable plasticizer for said copolymer, said plasticizer being of low volatility, compatible with said copolymer, soluble in said alkyl phosphate and present in an amount constituting 15% to 30% by weight of the total vehicle solids, said ink being free of volatile solvents and setting by absorption of said alkyl phosphate in said film.

2. For printing films formed of a composition consisting essentially of a butadiene-acrylonitrile copolymer, a polymer selected from the group which consists of polyvinyl chloride, a copolymer of vinyl chloride and vinyl acetate in which the vinyl chloride is the major constituent, a copolymer of vinylidene chloride and vinyl chloride in which the vinylidene chloride is present in an amount not over 70%, and an anti-blocking agent, an ink comprising colored pigments and a vehicle consisting essentially of an alkyl phosphate of the class which consists of triethyl phosphate, tri-(n)propyl phosphate and tri(n)butyl phosphate, a vinyl chloride-vinyl acetate copolymer containing 86% vinyl chloride, said copolymer being soluble in said alkyl phosphate and present in an amount of from 25% to 33⅓% by weight of said alkyl phosphate, and a resinous, non-migratable plasticizer for said copolymer, said plasticizer being of low volatility, compatible with said copolymer, soluble in said alkyl phosphate and present in an amount constituting 15% to 30% by weight of the total vehicle solids, said ink being free of volatile solvents and setting by absorption of said alkyl phosphate in said film.

3. For printing films formed of a composition consisting essentially of a butadiene-acrylonitrile copolymer, a polymer selected from the group which consists of polyvinyl chloride, a copolymer of vinyl chloride and vinyl acetate in which the vinyl chloride is the major constituent, a copolymer of vinylidene chloride and vinyl chloride in which the vinylidene chloride is present in an amount not over 70%, and an anti-blocking agent, an ink comprising colored pigments and a vehicle consisting essentially of an alkyl phosphate of the class which consists of triethyl phosphate, tri-(n)propyl phosphate and tri-(n)butyl phosphate, a vinyl chloride-vinyl acetate copolymer containing 87% vinyl chloride, said copolymer being soluble in said alkyl phosphate and present in an amount of from 25% to 33⅓% by weight of said alkyl phosphate, and a resinous, non-migratable plasticizer for said copolymer, said plasticizer being of low volatility, compatible with said copolymer, soluble in said alkyl phosphate and present in an amount constituting 15% to 30% by weight of the total vehicle solids, said ink being free of volatile solvents and setting by absorption of said alkyl phosphate in said film.

4. For printing films formed of a composition consisting essentially of a butadiene-acrylonitrile copolymer, a polymer selected from the group which consists of polyvinyl chloride, a copolymer of vinyl chloride and vinyl acetate in which the vinyl chloride is the major constituent, a copolymer of vinylidene chloride and vinyl chloride in which the vinylidene chloride is present in an amount not over 70%, and an anti-blocking agent, an ink comprising colored pigments and a vehicle consisting essentially of an alkyl phosphate of the class which consists of triethyl phosphate, tri-(n)propyl phosphate and tri-(n)butyl phosphate, a vinyl chloride-vinyl acetate copolymer containing 65% vinyl chloride, said copolymer being soluble in said alkyl phosphate and present in an amount of from 25% to 33⅓% by weight of said alkyl phosphate, and a resinous, non-migratable plasticizer for said copolymer, said plasticizer being of low volatility, compatible with said copolymer, soluble in said alkyl phosphate and present in an amount constituting 15% to 30% by weight of the total vehicle solids, said ink being free of volatile solvents and setting by absorption of said alkyl phosphate in said film.

5. A film formed of a composition consisting essentially of a butadiene-acrylonitrile copolymer, a polymer selected from the group which consists of polyvinyl chloride, a copolymer of vinyl chloride and vinyl acetate in which the vinyl chloride is the major constituent, a copolymer of vinylidene chloride and vinyl chloride in which the vinylidene chloride is present in an amount not over 70%, and an anti-blocking agent, printed with an ink comprising colored pigments and a vehicle consisting essentially of an alkyl phosphate of the class which consists of triethyl phosphate, tri-(n)propyl phosphate and tri-(n)butyl phosphate, a vinyl chloride-vinyl acetate copolymer in which the vinyl chloride is the major constituent, said copolymer being soluble in said alkyl phosphate and present in an amount of from 25% to 33⅓% by weight of said alkyl phosphate, and a resinous, non-migratable plasticizer for said copolymer, said plasticizer being of low volatility, compatible with said copolymer, soluble in said alkyl phosphate and present in an amount constituting 15% to 30% by weight of the total vehicle solids, said ink being free of volatile solvents and setting by absorption of said alkyl phosphate in said film.

6. A film, formed of a composition consisting essentially of a butadiene-acrylonitrile copolymer, a polymer selected from the group which consists of polyvinyl chloride, a copolymer of vinyl chloride and vinyl acetate in which the vinyl chloride is the major constituent, a copolymer of vinylidene chloride and vinyl chloride in which the vinylidene chloride is present in an amount not over 70%, and an anti-blocking agent, printed with an ink comprising colored pigments and a vehicle consisting essentially of an alkyl phosphate of the class which consists of triethyl phosphate, tri-(n)propyl phosphate and tri-(n)butyl phosphate, a vinyl chloride-vinyl acetate copolymer containing 86% vinyl chloride, said copolymer being soluble in said alkyl phosphate and present in an amount of from 25% to 33⅓% by weight of said alkyl phosphate, and a resinous, non-migratable plasticizer for said copolymer, said plasticizer being of low volatility, compatible with said copolymer, soluble in said alkyl phosphate and present in an amount constituting 15% to 30% by weight of the total vehicle solids, said ink being free of volatile solvents and setting by absorption of said alkyl phosphate in said film.

7. A film, formed of a composition consisting essentially of a butadiene-acrylonitrile copolymer, a polymer selected from the group which consists of polyvinyl chloride, a copolymer of vinyl chloride and vinyl acetate in which the vinyl chloride is the major constituent, a copolymer of vinylidene chloride and vinyl chloride in which the vinylidene chloride is present in an amount not over 70%, and an anti-blocking agent, printed with an ink comprising colored pigments and a vehicle consisting essentially of an alkyl phosphate of the class which consists of triethyl phosphate, tri-(n)propyl phosphate and tri-(n)butyl phosphate, a vinyl chloride-vinyl acetate copolymer containing 87% vinyl chloride, said copolymer being soluble in said alkyl phosphate and present in an amount of from 25% to 33⅓% by weight of said alkyl phosphate, and a resinous, non-migratable plasticizer for said copolymer, said plasticizer being of low volatility, compatible with said copolymer, soluble in said alkyl phosphate and present in an amount constituting 15% to 30% by weight of the total vehicle solids, said ink being free of volatile solvents and setting by absorption of said alkyl phosphate in said film.

8. A film, formed of a composition consisting essentially of a butadiene-acrylonitrile copolymer, a polymer selected from the group which consists of polyvinyl chloride, a copolymer of vinyl chloride and vinyl acetate in which the vinyl chloride is the major constituent, a copolymer of vinylidene chloride and vinyl chloride in which the vinylidene chloride is present in an amount not over 70%, and an anti-blocking agent, printed with an ink comprising colored pigments and a vehicle consisting essentially of an alkyl phosphate of the class which consists of triethyl phosphate, tri-(n)propyl phosphate and tri-(n)butyl phosphate, a vinyl chloride-vinyl acetate copolymer containing 65% vinyl chloride, said copolymer being soluble in said alkyl phosphate and present in an amount of from 25% to 33⅓% by weight of said alkyl phosphate, and a resinous, non-migratable plasticizer for said copolymer, said plasticizer being of low volatility, compatible with said copolymer, soluble in said alkyl phosphate and present in an amount constituting 15% to 30% by weight of the total vehicle solids, said ink being free of volatile solvents and setting by absorption of said alkyl phosphate in said film.

9. A method which comprises printing a film, formed of a composition consisting essentially of a butadiene-acrylonitrile copolymer, a polymer selected from the group which consists of polyvinyl chloride, a copolymer of vinyl chloride and vinyl acetate in which the vinyl chloride is the major constituent, a copolymer of vinylidene chloride and vinyl chloride in which the vinylidene chloride is present in an amount not over 70%, and an anti-blocking agent, with an ink free of volatile solvents and comprising colored pigments and a vehicle consisting essentially of an alkyl phosphate of the class which consists of triethyl phosphate, tri-(n)propyl phosphate and tri-(n)butyl phosphate, a vinyl chloride-vinyl acetate copolymer in which the vinyl chloride is the major constituent, said copolymer being soluble in said alkyl phosphate and present in an amount of from 25% to 33⅓% by weight of said alkyl phosphate, and a resinous, non-migratable plasticizer for said copolymer, said plasticizer being of low volatility, compatible with said copolymer, soluble in said alkyl phosphate and present in an amount constituting 15% to 30% by weight of the total vehicle solids, and permitting the prints to dry by the absorption of said alkyl phosphate by said film.

10. A method which comprises printing a film, formed of a composition consisting essentially of a butadiene-acrylonitrile copolymer, a polymer selected from the group which consists of polyvinyl chloride, a copolymer of vinyl chloride and vinyl acetate in which the vinyl chloride is the major constituent, a copolymer of vinylidene chloride and vinyl chloride in which the vinylidene chloride is present in an amount not over 70%, and an anti-blocking agent, with an ink free of volatile solvents and comprising colored pigments and a vehicle consisting essentially of an alkyl phosphate of the class which consists of triethyl phosphate, tri-(n)propyl phosphate and tri-(n)butyl phosphate, a vinyl chloride-vinyl acetate copolymer containing 86% vinyl chloride, said copolymer being soluble in said alkyl phosphate and present in an amount of from 25% to 33⅓% by weight of said alkyl phosphate, and a resinous, non-migratable plasticizer for said copolymer, said plasticizer being of low volatility, compatible with said copolymer, soluble in said alkyl phosphate and present in an amount constituting 15% to 30% by weight of the total vehicle solids, and permitting the prints to dry by the absorption of said alkyl phosphate by said film.

11. A method which comprises printing a film, formed of a composition consisting essentially of a butadiene-acrylonitrile copolymer, a polymer selected from the group which consists of polyvinyl chloride, a copolymer of vinyl chloride and vinyl acetate in which the vinyl chloride is the major constituent, a copolymer of vinylidene chloride and vinyl chloride in which the vinylidene chloride is present in an amount not over 70%, and an anti-blocking agent, with an ink free of volatile solvents and comprising colored pigments and a vehicle consisting essentially of an alkyl phosphate of the class which consists of triethyl phosphate, tri-(n)propyl phosphate and tri-(n)butyl phosphate, a vinyl chloride-vinyl acetate copolymer containing 87% vinyl chloride, said copolymer being soluble in said alkyl phosphate and present in an amount of from 25% to 33⅓% by weight of said alkyl phosphate, and a resinous, non-migratable plasticizer for said copolymer, said plasticizer being of low volatility, compatible with said copolymer, soluble in said alkyl phosphate and present in an amount constituting 15% to 30% by weight of the total vehicle solids, and permitting the prints to dry by the absorption of said alkyl phosphate by said film.

12. A method which comprises printing a film, formed of a composition consisting essentially of a butadiene-acrylonitrile copolymer, a polymer selected from the group which consists of polyvinyl chloride, a copolymer of vinyl chloride and vinyl acetate in which the vinyl chloride is the major constituent, a copolymer of vinylidene chloride and vinyl chloride in which the vinylidene chloride is present in an amount not over 70%, and an anti-blocking agent, with an ink free of volatile solvents and comprising colored pigments and a vehicle consisting essentially of an alkyl phosphate of the class which consists of triethyl phosphate, tri-(n)propyl phosphate and tri-(n)butyl phosphate, a vinyl chloride-vinyl acetate copolymer containing 65% vinyl chloride, said copolymer being soluble in said alkyl phosphate and present in an amount of from 25% to 33⅓% by weight of said alkyl phosphate, and a resinous, non-migratable plasticizer for said copolymer, said plasticizer being of low volatility, compatible with said copolymer, soluble in said alkyl phosphate and present in an amount constituting 15% to 30% by weight of the total vehicle solids, and permitting the prints to dry by the absorption of said alkyl phosphate by said film.

13. The ink as set forth in claim 1 wherein the resinous non-migratable plasticizer is a polyester of sebacic acid and propylene glycol.

14. The ink as set forth in claim 2 wherein the resinous non-migratable plasticizer is a polyester of sebacic acid and propylene glycol.

15. The ink as set forth in claim 3 wherein the resinous non-migratable plasticizer is a polyester of sebacic acid and propylene glycol.

16. The ink as set forth in claim 4 wherein the resinous non-migratable plasticizer is a polyester of sebacic acid and propylene glycol.

17. The printed film as set forth in claim 5 wherein the resinous non-migratable plasticizer of th ink is a polyester of sebacic acid and propylene glycol.

18. The printed film as set forth in claim 6 wherein the resinous non-migratable plasticizer of the ink is a polyester of sebacic acid and propylene glycol.

19. The printed film as set forth in claim 7 wherein the resinous non-migratable plasticizer of the ink is a polyester of sebacic acid and propylene glycol.

20. The printed film as set forth in claim 8 wherein the resinous non-migratable plasticizer of the ink is a polyester of sebacic acid and propylene glycol.

21. The method as set forth in claim 9 wherein the resinous non-migratable plasticizer of the ink is a polyester of sebacic acid and propylene glycol.

22. The method as set forth in claim 10 wherein the resinous non-migratable plasticizer of the ink is a polyester of sebacic acid and propylene glycol.

23. The method as set forth in claim 11 wherein the resinous non-migratable plasticizer of the ink is a polyester of sebacic acid and propylene glycol.

24. The method as set forth in claim 12 wherein the resinous non-migratable plasticizer of the ink is a polyester of sebacic acid and propylene glycol.

GEORGE M. ADAMS.

REFERENCES CITED

The following references are of record in the file of this patent:

UNITED STATES PATENTS

| Number | Name | Date |
| --- | --- | --- |
| 2,268,593 | Huber | June 6, 1942 |
| 2,330,353 | Henderson | Sept. 28, 1943 |
| 2,453,052 | Van Etten | Nov. 2, 1948 |

OTHER REFERENCES

"Printing Inks," Ellis, New York, pages 354 and 355, 1940.

"Vinylite Copolymer Resins," Carbide and Carbon Chemical Corp., 1942, New York, New York, page 27 (table 3), pages 83–85.

"Synthetic Resins for Coatings," Resinous Products and Chemical Company, Jan. 31, 1947, Philadelphia, Pa. (pages 58–59).